United States Patent [19]

Iyengar et al.

[11] Patent Number: 4,789,404
[45] Date of Patent: Dec. 6, 1988

[54] SOFT TEXTURED HIGH STRENGTH ALKALI BLUE PIGMENT AND PROCESS FOR PREPARING THE SAME

[75] Inventors: Doreswamy R. Iyengar, Ann Arbor; James J. Krikke, Hudsonville, both of Mich.

[73] Assignee: BASF Corporation, Parsippany, N.J.

[21] Appl. No.: 908,217

[22] Filed: Sep. 17, 1986

[51] Int. Cl.$^4$ ............................................. C04B 14/00
[52] U.S. Cl. ................... 106/408; 106/500; 106/504
[58] Field of Search ........... 106/288, 309, 306, 308 F, 106/308 Q, 308 M, 308 N

[56] References Cited

U.S. PATENT DOCUMENTS

| | | | |
|---|---|---|---|
| 3,582,381 | 6/1971 | Papenfuss | 106/309 |
| 3,635,745 | 1/1972 | Rentel et al. | 106/308 F |
| 3,712,824 | 1/1973 | Kiyokawa et al. | 106/309 |
| 4,032,357 | 6/1977 | Rees et al. | 106/309 |
| 4,251,276 | 2/1981 | Ferree et al. | 106/27 |
| 4,383,865 | 5/1983 | Iyengar | 106/308 N |
| 4,456,485 | 6/1984 | Iyengar | 106/288 Q |
| 4,469,519 | 9/1984 | Iyengar | 106/288 Q |

*Primary Examiner*—Paul Lieberman
*Assistant Examiner*—Willie J. Thompson
*Attorney, Agent, or Firm*—Rupert B. Hurley, Jr.

[57] ABSTRACT

A process for preparing a soft textured high strength Alkali Blue pigment toner comprising preparing an initial mixture from an alkali metal hydroxide, Alkali Blue pigment, resin, oil or varnish, free fatty acid and water and adding a mineral acid to said mixture to precipitate the pigment product.

13 Claims, No Drawings

SOFT TEXTURED HIGH STRENGTH ALKALI BLUE PIGMENT AND PROCESS FOR PREPARING THE SAME

BACKGROUND OF THE INVENTION

This invention relates to a pigment toner and to a process for its manufacture. More particularly, the invention relates to an improved Alkali Blue pigment toner characterized by soft texture and high tinting strength and to a process for its manufacture.

"Alkali Blue" is generally known in the art as, and is used herein to define, an arylpararosaniline sulfonic acid of the general formula

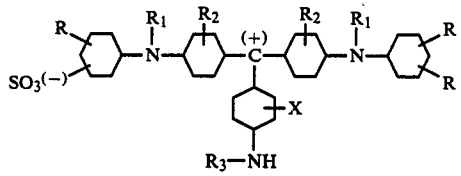

wherein R may be hydrogen, chlorine, bromine, alkyl containing from 1 to 4 carbon atoms, alkoxy containing from 1 to 4 carbon atoms, nitro-, amino-, sulfonamidealkylamino containing from 1 to 4 carbon atoms, $R_1$ and $R_2$ may be hydrogen, or alkyl containing from 1 to 4 carbon atoms, $R_3$ may be hydrogen or phenyl with or without a grouping such as R and X may be hydrogen, chlorine, bromine, $SO_3H$ or $COOH$.

A process for converting aryl pararosaniline sulfonic acid dyestuffs into soft textured pigments with high tinctorial strength is outlined in U.S. Pat. No. 3,582,381. The method calls for obtaining a fine aqueous suspension of the dyestuff which is subsequently treated at elevated temperatures (80° to 100° C.) with an aqueous emulsion (O/W emulsion) of natural or synthetic vehicles prepared by known methods using emulsifying agents and/or high speed equipment such as dissolvers, homogenizers, and colloid mills. The slurry is then suction filtered, washed and dried at lower temperatures (50° to 80° C.).

U.S. Pat. No. 3,712,824 uses a similar method with an emulsion made using a varnish comprised of (a) a water immiscible organic liquid with a high boiling point, (b) a resin which is compatible with the organic liquid used and (c) an organic sovent insoluble in water but which can solubilize or swell the resin. The varnish-emulsion prepared using emulsifying agents and/or a homogenizer is mixed with the pigment slurry and the mixture further agitated in a high speed agitator such as a dissolver to obtain a foamy mass which is dried in vacuum or by hot air (50° to 80° C.) to obtain an easily dispersible pigment.

A somewhat modified method is outlined in U.S. Pat. No. 4,032,357 where no separate emulsion is prepared. The pigment is coprecipitated with one or more anionic surfactants (in situ emulsifiers) and the resulting slurry is mixed with a hydrophobic oil phase, vigorously stirred and heat treated (if needed) to obtain a coated presscake which on drying (70° to 80° C.) yields a soft textured pigment.

U.S. Pat. No. 3,635,745 discloses a process for preparing coloristically valuable pigments by dissolving the pigment in an alkali solution and an additive. The additives that may be employed include "tall resin." The pigment can be precipitated from the alkaline solutions by the addition of acids.

In general the prior art methods involve two or more steps and call for the us of surfactant(s) treated pigments or emulsifying agents to make emulsions and high speed equipment to transfer the pigment from aqeuous into the oil phase. Accordingly, it is a purpose of the instant invention to provide a process for preparing soft textured, high strength Alkali Blue toners wherein little or no external energy is needed for emulsification thus simplifying the process by eliminating the need for high speed equipment as well as the need for added surfactants.

SUMMARY OF THE INVENTION

The instant invention relates to a process for preparing a soft textured, high strength Alkali Blue pigment toner comprising preparing an initial mixture from an alkali metal hydroxide, Alkali Blue pigment, resin, an oil, or varnish, free fatty acid and water and adding a mineral acid to said initial mixture to precipitate the pigment product. In essence the process amounts to treating the pigment with a spontaneously formed emulsion obtained from the resin, oil or varnish and free fatty acid without the use of high speed mixing equipment or added surfactants.

DESCRIPTION OF THE PREFERRED EMBODIMENT

It is preferred to employ sodium hydroxide as the alkali metal hydroxide although potassium hydroxide could be used as well as lithium hydroxide.

Suitable Alkali Soluble Resins include resins (synthetic or natural) with an acid number of approximately 100 or above such as: rosin, rosin ester, hydrogenated rosin, maeeated rosins and rosin esters, fumarated rosin and rosin esters, tall oil resins, terpene based resins such as Petrex acid (marketed by Hercules Co.), and resin modified acid phenol resins.

Oils which may be employed in the process of the instant invention include natural fats and oils such as vegetable oils and marine fats and oils. Examples of suitable vegetable oils are castor oil, coconut oil, corn oil, cottonseed oil, linseed oil, olive oil, palm oil, peanut oil, safflower oil, soybean oil, and tall oil. Examples of suitable marine fats and oils include menhaden, salmon, sardine, and sperm oil.

In lieu of the oil, a varnish, i.e., a resin plus a solvent, may be employed. The percent solvent in the varnish would generally range from about 35 to 90 percent, preferably 60 to 80 percent. Almost any conventional varnish may be employed.

Natural fats and oils contain a large number of fatty acids both of the saturated and unsaturated type. The more common of these acids are Lauric ($C_{12}$-dodecanoic), Myrisitc ($C_{14}$-tetradecanooic), palmitic ($C_{16}$-hexadecanoic), stearic ($C_{18}$-octadecanoic), oleic ($C_{18}$-octadecenoic), Linoleic ($C_{18}$-octadecadienoic) and linoleic ($C_{18}$-octadecadienoic and linolenic ($C_{18}$-octadecatrienoic) acids.

An oil that contains an amount of free acid in excess of about 20 percent by weight, provides the source of fatty acid called for in the process and it is not necessary to provide a fatty acid from a separate source. The oils listed above generally contain major amounts of fatty acids in the range $C_{12}$–$C_{18}$. Thus it would appear that providing an acid from a separate source would not be necessary. However, this is not always true since with most of the oils that include fatty acid the fatty acid is not present in the free form but in a combined state as glycerides, either simple or of the mixed type. A simple glyceride is a glyceride of one fatty acid only while a mixed glyceride can have as many as three different fatty acids. While the oils usually contain small amounts of free acids, in order to avoid the need for inclusion of a fatty acid from a separate source, it is necessary that the amount of free acid exceed about 20 percent by weight of the oil. The amount of free acid present in a fat or oil can be obtained from direct neutralization of the fat or oil and is expressed as the acid value which is defined as the number of milligrams of potassium hydroxide required to neutralize the free acid in one gram of the oil. When the free acid content of the oil or fat exceeds about 20 percent by weight, it is not necessary to provide fatty acid from another source. However, most of the oils of vegetable or animal origin which may be employed consist of $C_{12}$–$C_{18}$ fatty acids in a combined form as simple or mixed glyerides and contain less than 20 percent free fatty acid.

Where oils or varnishes are employed which contain less than 20 percent by weight free acid any individual or mixture of $C_{12}$ to $C_{18}$ free fatty acid derived from any source can be used to achieve the same purpose.

Suitable fatty acids which may be added are as follows: decanoic, lauric (dodecanoic), myristic (tetradecanoic), cis-9-tetradecenoic, pentadecanoic, cis-9-pentadecenoic, palmitic (hexadecanoic), cis-9-hexadecenoic, hexadecadienoic, heptadecanoic, stearic (octadecanoic), oleic (cis-9-octadecanoic), linoleic (cis-9-, cis-12-octadecandienoic), linolenic (cis-9-, cis-12-, cis-15-octadecatrienoic), octadecatetraenoic, nonadecanoic, eicosanoic, cis-9-eicosenoic, eicosadienoic, eicosatrienoic, arachidonic (cis-5, cis-8, cis-11, cis-13-14- eicosatetraenoic), eicosapentaenoic, docosanoic, cis-13-docosenoic, docosatetraenoic, 4-, 8-, 12-, 15-, 19-docosapentaenoic, docosahexaenoic. Most any source of these acids is suitable.

As pointed out above, the fats and oils of vegetable or animal origin primarily contain $C_{12}$ to $C_{18}$ fatty acids in a combined form as simple or mixed glycerides and contains less than 20 percent free fatty acid. However, there are exceptions. Tall oil, which is a by-product obtained from the waste liquors of the pinewood pulp mills, is primarily a mixture of free fatty and resins acids (76 to 95 percent) with small amounts of sterols, higher alcohols, etc.

The fatty acid contents vary from 20 to 60 percent, the resin acids from 10 to 60 percent, and the unsaponifiable constituents from as low as 5 to as high as 4 percent. Raw tall oil or, in other words, natural tall oil is very dark and has an extremely disagreeable odor. Refined or distilled tall oil eliminates most of the resinic acids but not the fatty acids whereby the fatty acid content is high. The resinic acids of U.S. Pat. No. 3,635,745 are natural resinic acids. They are obtained as a by-product of refining the crude tall oil. Accordingly in the instant invention the refined tall oil is used whereas the above patent uses the resinic acids obtained as a byproduct of refining. Thus the tall oil employed in the instant invention is refined tall oil containing fatty acids as a major constituent and resin acids as a minor constituent. This is a distinction from the "tall resin" which is one of a class of natural resins referred to in column 2 of U.S. Pat. No. 3,635,745.

Mixtures of tall oil with other fats and/or oils where the mixture has sufficient (approximately 20 percent) free acid can also be used to achieve spontaneous emulsification of the total mix.

Suitable tall oil products include those sold by Union Camp Corporation as follows. Acid refined tall oil having a 51.5 percent free acid content sold under the trademark Unitol S; reconstituted crude tall oil containing 62.0 percent free fatty acid sold under the trademark Unitol CX; distilled tall oil having a free fatty acid content of 72.0 percent sold under the trademark Unitol DT-25 and a tall oil fatty acid product containing 90.9 percent fatty acid sold under the trademark Unitol DSR.

Where a varnish or an oil containing less than 20 percent by weight free fatty acid is employed, the amount of added fatty acid can vary from about 30 to 75 percent and preferably 40 to 55 percent by weight of the total of the varnish or oil plus fatty acid.

The mineral acid employed for precipitation can be any conventional mineral acid such as HCl, $H_2SO_4$, $HNO_3$, or $H_3PO_4$ the preferred acid being HCl. The acid can be used as an aqueous solution containing 2 to 10 percent by weight of the acid, preferably 2 percent, balance water. The initial mixture is prepared from by weight about 5.0 to 20 percent, preferably about 10 to 15 percent alkali metal hydroxide, about 40 to 85 percent, preferably about 55 to 70 percent Alkali Blue pigment, about 1 to 20 percent, preferably about 10 to 15 percent alkali soluble resin, about 1 to 20 percent, preferably about 10 to 15 percent oil or varnish, about 1 to 20, preferably about 5 to 15 percent free fatty acid, balance water. It is to be understood that with the exception of tall oil, the percentage of oil or varnish set forth above and hereinafter is exclusive of any free fatty acid contained therein and the percentage of free fatty acid is the total of any free fatty acid contained in the oil and any added free fatty acid. Where tall oil is employed, the amount of tall oil is about 10 to 50 percent by weight which is all of the tall oil used including the free fatty acid contained therein. Generally the ratio of alkali soluble resin to the oil or varnish plus fatty acid, will range from about 1:2 to 2:1. Preferably the amount of mineral acid employed is sufficient to neutralize the caustic solution of the Alkali Blue to completely precipitate the pigment and lower the pH to about 1.

The following examples are intended to exemplify the invention. All parts are by weight and all temperatures are in degree centigrade throughout this specification and claims unless otherwise designated. In the following examples the products produced according to the instant invention were compared with each other and with the standard soft textured Alkali Blue toner which had 24 percent by weight fumerated rosin ester of an acid number of 290 A conventional vehicle was employed which consists of 40 percent hydrocarbon oils sold by the Magie Brothers, Franklin Park, Ill., under the trademark Magiesol 47 and 60 percent of an aromatic modified hydrocarbon resin sold under the name Petrorez 140 by Lawter Chemicals, Inc. of Northbrook, Ill.

Using the above vehicle, the ease of dispersion was determined by the method which consists of mixing 0.1 gram of the dreed pigment with 5 grams of a white paste containing ca. 40 percent of zinc oxide in a beat set type lithographic varnish. The mixture is then hand spatulated on a clean Hoover Muller plate to wet the pigment, and is spatulated until uniform. The sample is then mulled for 25 revolutions with the fixed weight (2500 grams) on the Hoover Muller. The plates are scraped and the operation repeated. The plates ar scraped again and one-fourth of the sample is removed and set aside for later comparison. This one-fourth of the sample is generally designated 2X and is indicated under "Texture" in the Tables. The remainder of the sample is mulled for another 25 revolutions with a single weight on the Hoover muller, scraped and mulled again. The plates are then scraped again, and one-third of the remaining sample is removed and set aside which is designated 4X and is indicated under "Texture" in the Tables. The remainder is then mulled twice again as with the two previous batches and one-half of the remaining sample is removed and set aside which is designated 6X and indicated in the Tables under "Texture."

The remaining half of the last sample is then employed for determining the "ultimate strength" by mulling this portion on the Hoover muller with all the Hoover muller weights (7500 grams) three times at 50 revolutions each. That is to say it is mulled for 50 revolutions, scraped, mulled for 50 revolutions again, scraped, and finally mulled a third time for 50 revolutions. This sample is designated the ultimate and the values are set forth in the Table under the heading "Ultimate Strength."

The samples obtained from each of the following, Examples 2-27, are compared with the standard in each case. The numerical values shown in the Table are obtained by a series of comparisons of each example with the standard whereby when the color is stronger than the standard, the white paste in the vehicle described above is added to dilute the sample of the Example in increments after which each dilution is checked against the standard by drawdown until the strength is the same as the standard. The percentage of pigment in the diluted sample is then determined and the difference between that percentage and 100 is indicated as the number preceded by the indication +. For example, the Ultimate Strength sample of Example 2 had to be diluted down to the point where the amount of pigment was 78 percent of that in the standard. Seventy-eight is then substracted from 100 to give 22, which is the number shown in the Table preceded by the +. This means that it is 22 percent stronger than the standard. Where the sample is obviously weaker than the standard, more pigment is added until color strength is equal to the standard. The percentage of pigment as compared to the percentage in the standard is then determined For example, with Example 13 this was 111 percent for the Ultimate Strength, and it is indicated in the Table as −11.

This same testing and numerical system applies also to the numbers shown in the "Texture" columns. For example, +50 means that it took only half as much pigment to obtain the same strength as obtained in the standard, and −25 means that it required 25 percent more pigment to achieve the same strength as the standard. The texture can be determined by the numbers under the "Texture" column comparing the strength of each example for two passes against that of six passes. The closer the strength value of two passes is to that for six passes, the more easily dispersed the material is. For example, where the values for two passes and six passes are identical, it is fully dispersed in two passes. The texture numbers such as those for Example 4 merely mean that the strength after two passes was 20 percent stronger than the standard was after two passes and was 16 percent stronger after six passes than the standard was after six passes. It does not mean that the values are the same in absolute terms. If you compare these with the "Ultimate Strength" values, Example 4 is only 11 percent stronger than the standard after three more passes. This indicates that while the ultimate strength is only 11 percent better, the initial strength is 20 percent better than the standard which, in other words, means that it disperses much faster than the standard.

EXAMPLE 1

(Standard)

In preparing the standard a caustic solution with Alkali Blue consisting principally of triphenyl-pararosaniline monosulfonic acid was prepared consisting of by weight 8 parts of the Alkali Blue, 2 parts of sodium hydroxide, balance water to 100 percent. A fumerated rosin ester having an acid number of 290, sold by Filtrez Resin Products under the trademark Filtrez 591 was added to this caustic solution in an amount of 24 percent by weight of the total solids. The solution was then heated to 60° C. with stirring and the pigment precipitated with an aqueous 2 percent HCl solution in an amount sufficient to lower the pH to less than 1.0. This is followed by heat treatment at 95° C. for five minutes, filtration, washing and drying at 50° C.

EXAMPLES 2-8

Seven products according to the instant invention were made up as set forth in Example 1 substituting for the 24 percent of fumarated rosin ester a composition of 14 percent fumarated rosin ester and 10 percent of a tall oil product identified by trademark and grade number in Table I below which trademarked tall oil products are described in the preceding specification. The results of the texture and ultimate strength tests as described above, compared to Example 1 as the standard, are set forth in Table I below.

TABLE I

| Example | Oil | Texture 2x | 4x | 6x | Ultimate Strength |
|---|---|---|---|---|---|
| 2 | Unitol DT-25 | −7 | +4 | +11 | +22 |
| 3 | Unitol DT-25 | +1 | +8 | +11 | +18 |
| 4 | Unitol DT-25 | +20 | +26 | +16 | +11 |
| 5 | Unitol DT-25 | −8 | −4 | +6 | +9 |
| 6 | Unitol DT-25 | +11 | +9 | +9 | +20 |
| 7 | Unitol S | −21 | −9 | +1 | +6 |
| 8 | Unitol DSR | +8 | +17 | +26 | +29 |

EXAMPLES 9-17

Examples 9-17 were prepared in a manner similar to that described for Examples 2-8 with the exception that only a single additive was employed and the amounts are as shown in Table II below. The products of Examples 9-17 were tested for texture and ultimate strength by the methods described above using the product of Example 1 as a standard. The results are shown in Table II below.

TABLE II

| Example | Additive Used | Amount | 2x | 4x | 6x | Ultimate Strength |
|---|---|---|---|---|---|---|
| 9 | Pentalyn-269 | 24% | +10 | +7 | +4 | +8 |
| 10 | Gum Rosin | 24% | −4 | +3 | +4 | +6 |
| 11 | JonRez (SM-705) | 24% | +12 | +3 | +5 | +3 |
| 12 | Filtrez 591 | 24% | −11 | −5 | −2 | +6 |
| 13 | Unitol DT-25 | 24% | −34 | −43 | −39 | −11 |
| 14 | Unitol DT-25 | 20% | −24 | −21 | −9 | +15 |
| 15 | Unitol S | 20 | −42 | −31 | −34 | −9 |

TABLE II-continued

| Example | Additive Used | Amount | 2x | 4x | 6x | Ultimate Strength |
|---------|---------------|--------|-----|-----|-----|-------------------|
| 16 | Unitol S | 20% | −45 | −36 | −18 | +2 |
| 17 | Unitol DSR | 20 | −30 | −45 | −42 | −8 |

In the above Table II, the additives may be described as follows:

Pentalyn-269 is an alkali soluble modified rosin ester sold by the Hercules Company.

JonRez (SM-705) is a maleic modified rosin ester sold by the St. John Resin Company and having an acid value of the resin of approximately 200.

Filtrez 591 is as described above in connection with Example 1.

The Unitol products are all described above in the specification.

It can be seen from Table II, with a few exceptions possibly due to laboratory error, the combination of a resin with the oil produces superior results to the use of resin alone or oil alone as can be seen from a comparison of the results of Table II with those of Table I.

EXAMPLES 18–22

These examples illustrate the results achieved where the total percentage of additive is 24 percent but the ratio of resin to oil varies. Products of Examples 18–22 were prepared as described for Examples 2–8 using in all cases the fumarated rosin ester having an acid number of 290, which is designated Filtrez 591 in the above Tables, and utilizing the Unitol DT-25 as the oil in all cases. These products were all tested for texture and ultimate strength as set forth above and the results are shown in Table III below.

TABLE III

| Example | Resin Percent | Oil Percent | 2x | 4x | 6x | Ultimate Strength |
|---------|---------------|-------------|-----|-----|-----|-------------------|
| 18 | 16 | 8.0 | +15 | +16 | +18 | +29 |
| 19 | 14 | 10.0 | +11 | +9 | +19 | +20 |
| 20 | 12 | 12.0 | +15 | +11 | +16 | +34 |
| 21 | 10 | 14.0 | +4 | −4 | +5 | +19 |
| 22 | 8 | 16.0 | −5 | −10 | +10 | +31 |

From the above it can be seen that even though the ratio of resin to oil was varied, the ultimate strength was substantially greater than the standard.

EXAMPLES 23–27

These products were prepared substantially the same as Examples 18–22 with the exception that in all Examples the ratio of oil to resin is 1:1 and the total amount of oil plus resin is varied from 16 to 32 percent as shown in Table IV below. These products were subjected to the texture and ultimate strength tests set forth above, the results of which are shown in Table IV below.

TABLE IV

| Example No. | Total Additives, % | 2x | 4x | 6x | Ultimate Strength |
|-------------|---------------------|-------|-----|-----|-------------------|
| 23 | 16 | −21 | −7 | +2 | +9 |
| 24 | 20 | Equal | +5 | +8 | +11 |
| 25 | 24 | +3 | +6 | +8 | +8 |
| 26 | 28 | +8 | +6 | +8 | +7 |
| 27 | 32 | +6 | +7 | +5 | +4 |

Having thus described the invention, what is claimed is:

1. A process for preparing a soft textured high strength Alkali Blue pigment toner comprising preparing an initial mixture from an alkali metal hydroxide, Alkali Blue pigment, resin, oil or varnish, free fatty acid and water, so that a spontaneous emulsion forms, and subsequently adding a mineral acid to said emulsion to precipitate the pigment product.

2. The process of claim 1 wherein said initial mixture is prepared from about 5.0 to 20 percent alkali metal hydroxide, about 40 to 85 percent Alkali Blue pigment, about 1 to 20 percent alkali soluble resin, about 1.0 to 20 percent oil or varnish, about 1.0 to 20 percent free fatty acid, balance water.

3. The process of claim 1 employing an oil.

4. The process of claim 3 wherein said initial mixture is prepared from about 5.0 to 20 percent alkali metal hydroxide, about 40 to 85 percent Alkali Blue pigment, about 1 to 20 percent alkali soluble resin, about 1.0 to 20 percent oil, about 1.0 to 20 percent free fatty acid, balance water.

5. The process of claim 4 wherein said resin is fumarated rosin ester.

6. The process of claim 1 employing a varnish.

7. The process of claim 5 wherein said initial mixture is prepared from about 5.0 to 20 percent alkali metal hydroxide, about 40 to 85 percent Alkali Blue, about 1 to 20 percent alkali soluble resin, about 1.0 to 20 percent varnish, about 1.0 to 20 percent free fatty acid, balance water.

8. The process of claim 7 wherein said varnish contains about 35 to 90 percent solvent by total weight of the varnish.

9. The process of claim 8 wherein said alkali soluble resin is a fumarated rosin ester.

10. A process for preparing a soft textured high strength Alkali Blue pigment mixture from an alkali metal hydroxide, Alkali Blue pigment, resin, oil containing greater than 20 percent by weight of the oil component of a free fatty acid, and water so that a spontaneous emulsion forms, and adding a mineral acid to said mixture to precipitate the pigment product.

11. The process of claim 10 wherein said oil is a refined tall oil.

12. The process of claim 11 wherein said initial mixture is prepared from about 5.0 to 20 percent alkali metal hydroxide, about 40 to 85 percent Alkali Blue pigment, about 1 to 20 percent alkali soluble resin, about 10 to 50 percent refined tall oil, balance water.

13. The process of claim 12 wherein said alkali soluble resin is fumarated rosin ester.

* * * * *